US008215215B2

(12) United States Patent
Chuang

(10) Patent No.: US 8,215,215 B2
(45) Date of Patent: Jul. 10, 2012

(54) PROTECTIVE COVER STRUCTURE OF A DESK SAWING MACHINE

(76) Inventor: Bor-Yann Chuang, Taiping (TW)

( * ) Notice: Subject to any disclaimer, the term of this patent is extended or adjusted under 35 U.S.C. 154(b) by 364 days.

(21) Appl. No.: 12/721,242

(22) Filed: Mar. 10, 2010

(65) Prior Publication Data

US 2011/0219928 A1 Sep. 15, 2011

(51) Int. Cl.
*B23D 45/06* (2006.01)
*B27B 3/28* (2006.01)

(52) U.S. Cl. ........................................ 83/102.1; 83/478

(58) Field of Classification Search .................... 83/478, 83/102, 102.1, 469, 470, 471–477.2
See application file for complete search history.

(56) References Cited

U.S. PATENT DOCUMENTS 2,810,408 A * 10/1957 Boice et al. .................... 83/473
3,249,134 A * 5/1966 Vogl et al. ...................... 83/478
5,918,522 A * 7/1999 Benedict et al. ................ 83/478
8,096,220 B2 * 1/2012 Weir et al. ...................... 83/478
8,104,386 B2 * 1/2012 Chen ............................ 83/102.1
2009/0158906 A1 * 6/2009 Shibata ........................ 83/477.2
2010/0206151 A1 * 8/2010 Jan ................................ 83/478
2010/0224044 A1 * 9/2010 Lee ................................ 83/478
2010/0257990 A1 * 10/2010 Schell et al. .................... 83/397
2010/0319509 A1 * 12/2010 Chuang ........................ 83/102.1
2011/0061506 A1 * 3/2011 Frolov ......................... 83/102.1
2011/0219928 A1 * 9/2011 Chuang .......................... 83/478
* cited by examiner

*Primary Examiner* — Sean Michalski

(74) *Attorney, Agent, or Firm* — Ming Chow; Sinorica, LLC

(57) ABSTRACT

A protective cover structure of a desk sawing machine includes a chopper board, a cover, two first side boards and two second side boards. The cover is disposed at an upper end of the chopper board. The two first side boards respectively disposed at two sides of the cover. One end of each of the first side boards is pivotally connected to the cover. The two second side boards respectively connected to another end of each of the first side boards. The first side boards and the second side boards can be operated independently to enhance shelter. The desk sawing machine can keep off the sawdust when cutting, providing a protective effect to the equipment and the user.

10 Claims, 10 Drawing Sheets

PROTECTIVE COVER STRUCTURE OF A DESK SAWING MACHINE

BACKGROUND OF THE INVENTION

1. Field of the Invention

The present invention relates to a protective cover structure of a desk sawing machine.

2. Description of the Prior Art

As shown in FIG. 1, a conventional desk sawing machine comprises a base 1. The base 1 comprises a worktable 2, a saw blade 3 and a chopper board 4. The chopper board 4 is pivotally connected with a cover 5. The cover 5 is used to protect the equipment and the user from being hurt by the sawdust when cutting a plank 6. Generally, the cover 5 is made in one piece. When the desk sawing machine proceeds to cutting, the front section of the cover 5 will be lifted up along with the movement of the plank 6 to expose the rear section. The sawdust may pop out from the cover 5 to hurt the equipment and the user accidentally. Therefore, it is necessary to improve the conventional cover.

SUMMARY OF THE INVENTION

The present invention is to provide a protective cover structure of a desk sawing machine and comprises a chopper board, a cover, two first side boards and two second side boards. The chopper board has two ends to define an upper end and a lower end. The cover is disposed at the upper end of the chopper board. The two first side boards are respectively disposed at two sides of the cover. Each of the first side boards has two ends to define a front end and a rear end. The front end of each of the first side boards is pivotally connected to the cover. The rear end of each of the first side boards is formed with a first connection hole. Each of the first side boards further has a limit groove which is located between the front end and the rear end. A limit member is inserted through the limit groove and connected to the cover to restrict rotation of the first side boards. The two second side boards are respectively disposed at the two sides of the cover. Each of the second side boards has two ends to define a front end and a rear end. The rear end of each of the second side boards is formed with a second connection hole. A connection member is inserted through the second connection hole and the first connection hole of the first side board and connected to the rear end of the first side board. In this pivot way, the first side boards and the second side boards can be operated independently to enhance shelter of covering the saw blade of the desk sawing machine completely. The desk sawing machine can keep off the sawdust when cutting, providing a protective effect to the equipment and the user.

DETAILED DESCRIPTION OF THE PREFERRED EMBODIMENTS

Embodiments of the present invention will now be described, by way of example only, with reference to the accompanying drawings.

Figure 1:
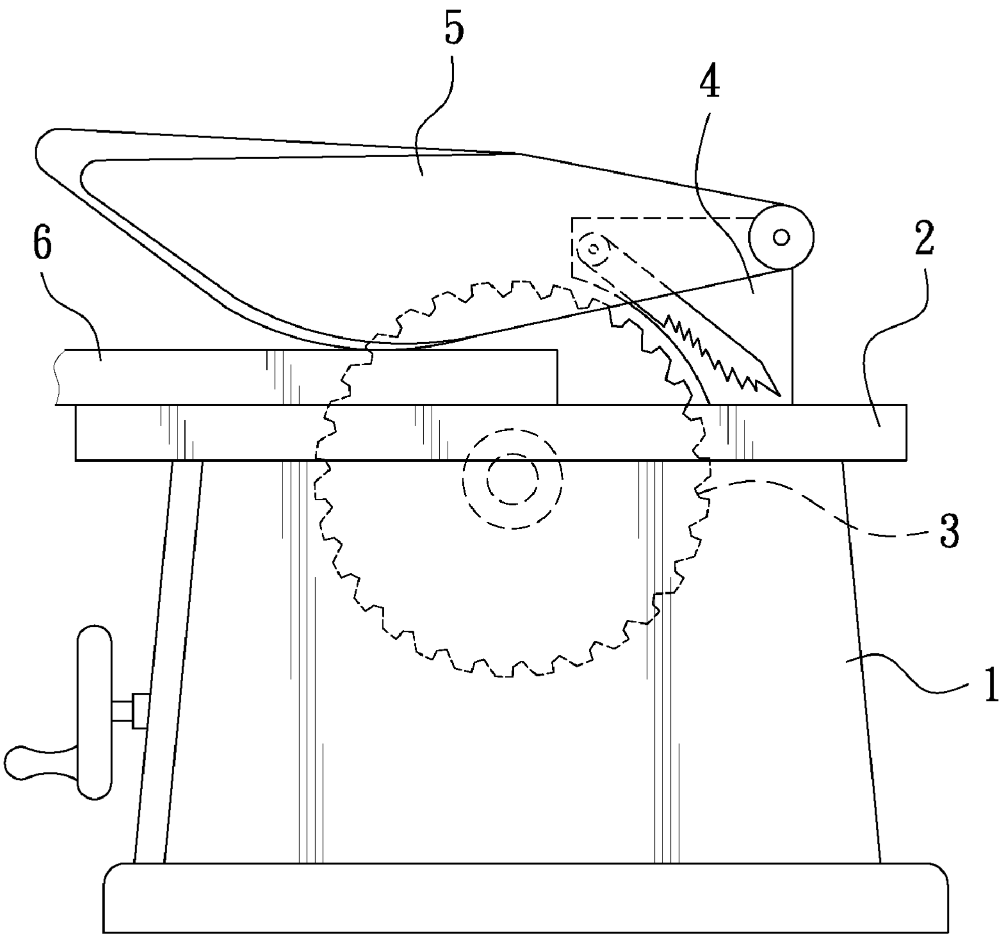
FIG. 1 PRIOR ART
FIG. 1 is a schematic view of a conventional desk sawing machine when in use.
Figure 2:
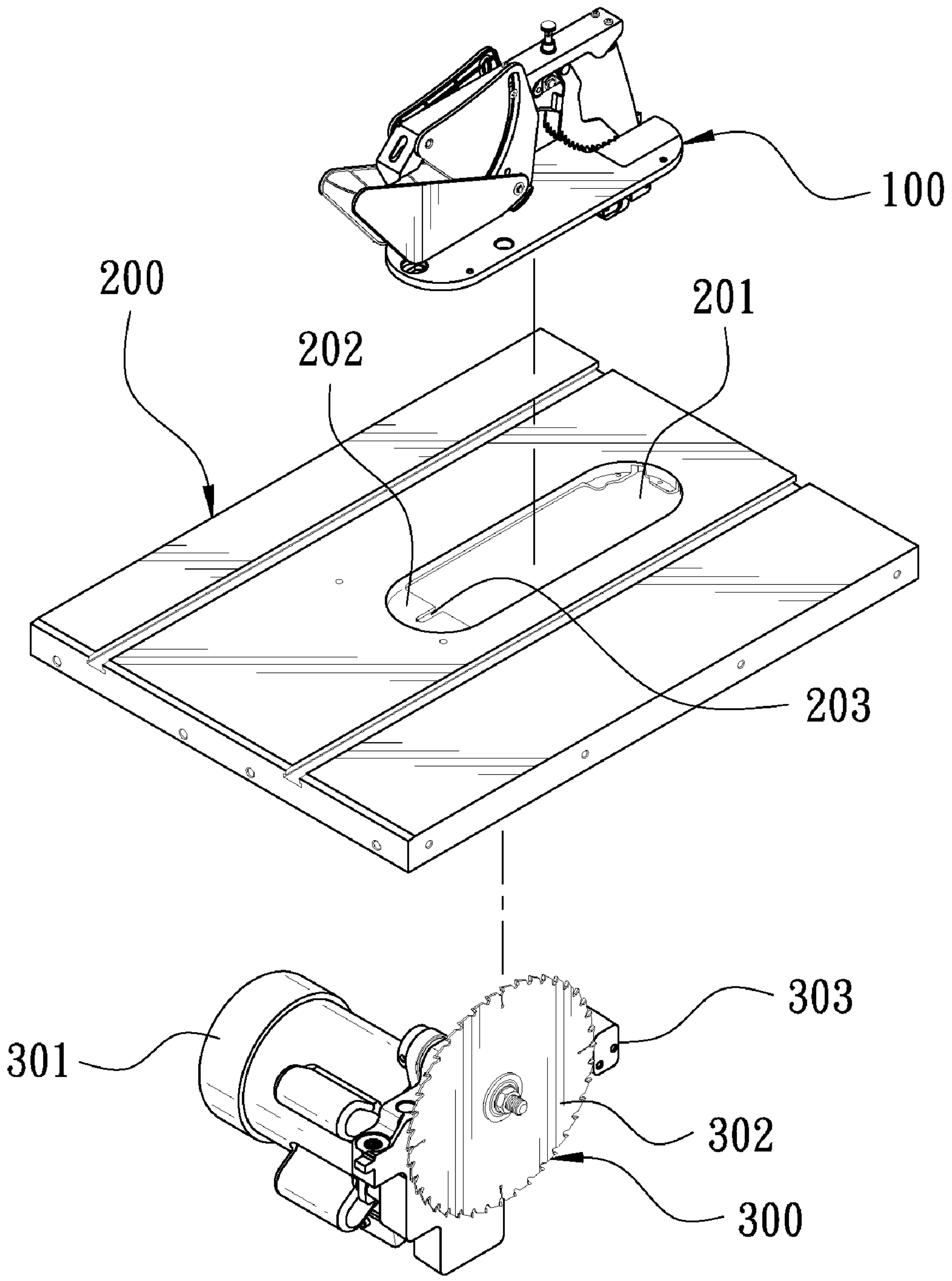
FIG. 2 is an exploded view according to a preferred embodiment of the present invention.
Figure 3:
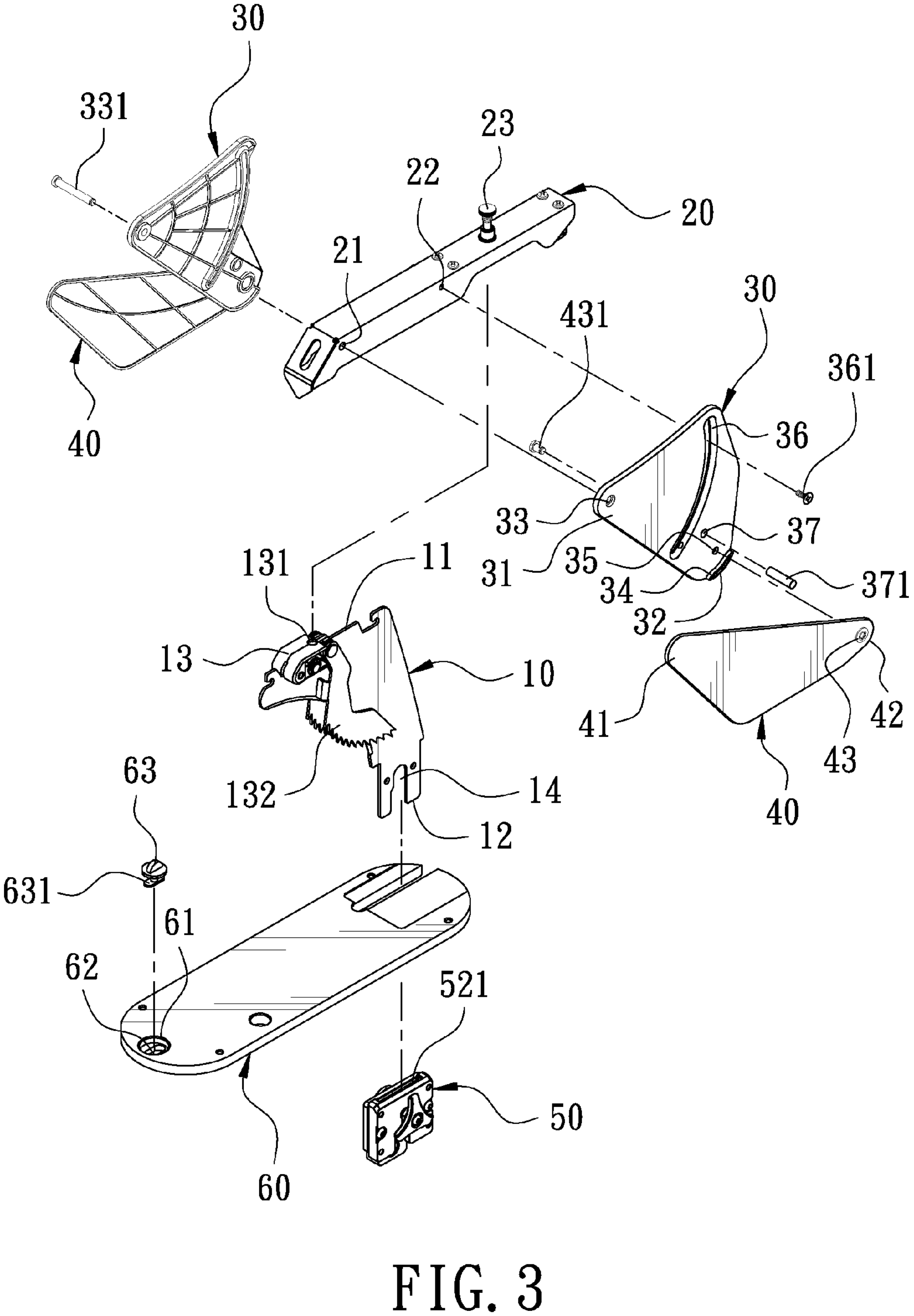
FIG. 3 is an exploded view showing the protective cover unit according to the preferred embodiment of the present invention.
Figure 4:
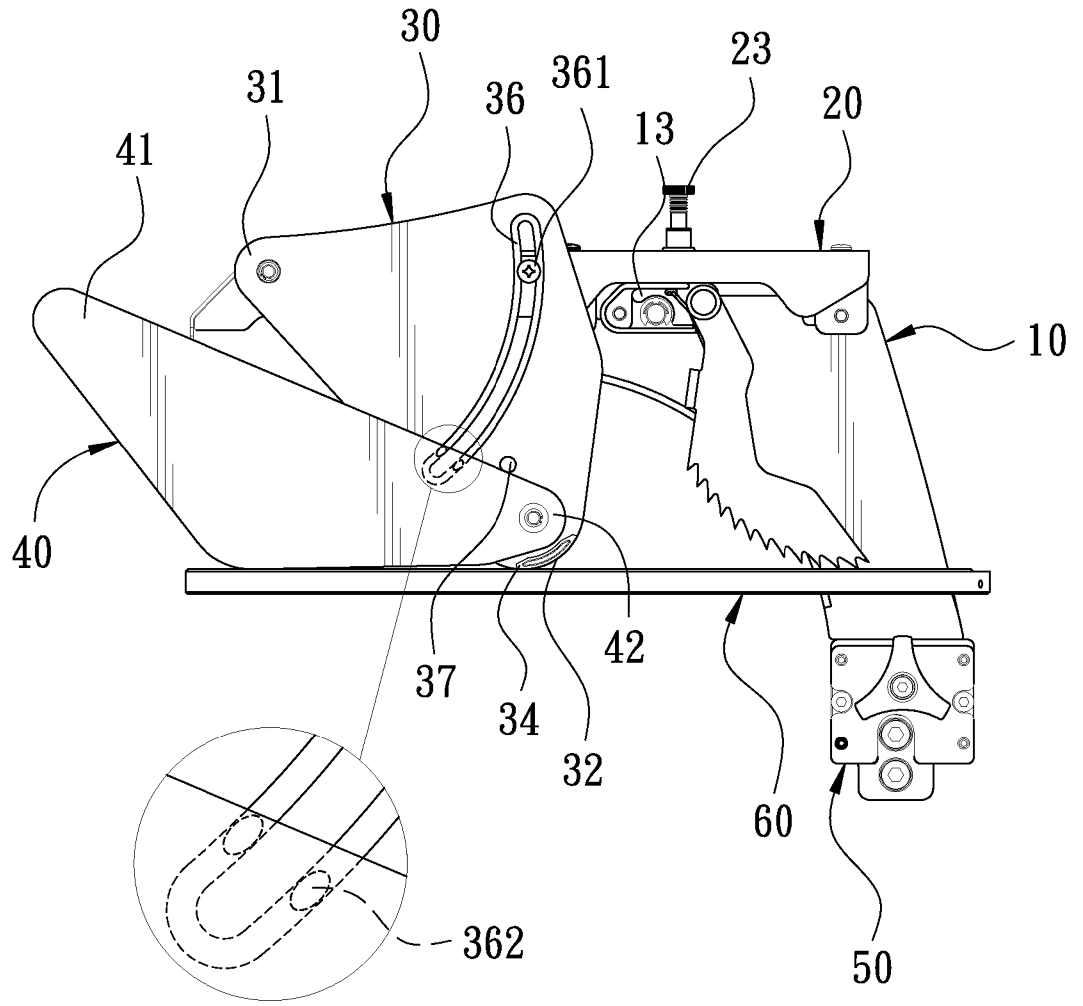
FIG. 4 is a side view showing the protective cover unit according to the preferred embodiment of the present invention.

As shown in FIG. 2 to FIG. 4, a desk sawing machine according to a preferred embodiment of the present invention comprises a base 300. One side of the base 300 is provided with a motor 301. The motor 301 has an output end connected with a circular saw blade 302. The base 300 comprises a fixing portion 303 which is located near the circular saw blade 302. The base 300 is fixedly connected with a worktable 200. The worktable 200 has a through hole 201 corresponding in position to the circular saw blade 302 for insertion of the circular saw blade 302. The worktable 200 further has a positioning portion 202 in the through hole 201. The positioning portion 202 has a positioning notch 203 thereon. The desk sawing machine further comprises a protective cover unit 100 in the through hole 201. Referring to FIG. 3 and FIG. 4, the protective cover unit 100 comprises a chopper board 10, a cover 20, two first side boards 30, and two second side boards 40.

The chopper board 10 has two ends to define an upper end 11 and a lower end 12.

The cover 20 is disposed at the upper end 11 of the chopper board 10. The cover 20 has a pivot hole 21 and a fixing hole 22 which communicate with two sides of the cover 20.

The two first side boards 30 are disposed at the two sides of the cover 20, respectively. Each first side board 30 has two ends to define a front end 31 and a rear end 32. The front end 31 of the first side board 30 is formed with an aperture 33 corresponding to the pivot hole 22 of the cover 20. A connection shaft 331 is inserted through the aperture 33 and the pivot hole 22 and connected to the cover 20. The rear end 32 of the first side board 30 is laterally formed with a limit block 34 and a first connection hole 35 close to the limit block 34. The first side board 30 further has an arc-shaped limit groove 36 which is located between the front end 31 and the rear end 32. A limit member 361 is inserted through the limit groove 36 and connected to the fixing hole 22 of the cover 20 to restrict the rotation of the first side boards 30. In this embodiment, the limit member 361 is a bolt. Besides, the first side board 30 has a limit hole 37 which is located between the first connection hole 35 and the limit groove 36 for insertion of a limit pin 371. Two side walls of the limit groove 36 of the first side board 30 are provided with a pair of positioning protrusions 362.

The two second side boards 40 are disposed at the two sides of the cover 20, respectively. Each second side board 40 has two ends to define a front end 41 and a rear end 42. The rear end 42 of the second side board 40 is formed with a second connection hole 43. A connection member 431 is inserted through the second connection hole 43 of the second side board 40 and the first connection hole 35 of the first side board 30 and connected to the rear end 32 of the first side board 30. In this embodiment, the connection member 431 is a bolt.

Figure 5:
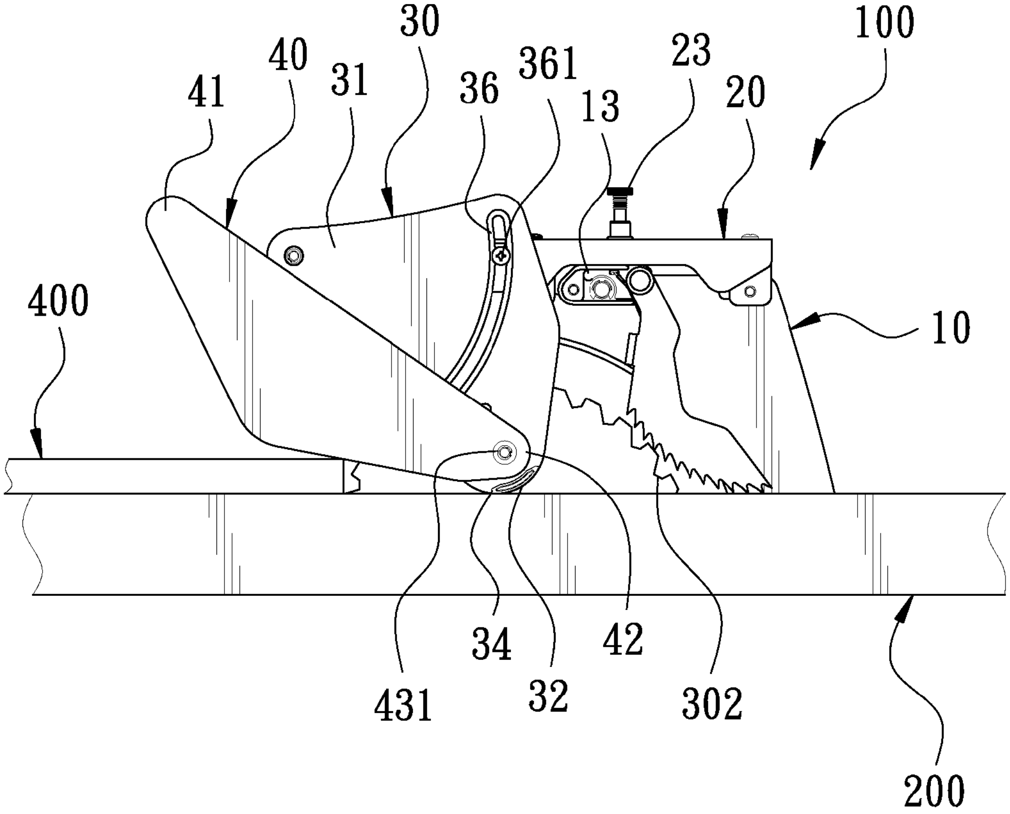
FIG. 5 is a schematic view of the preferred embodiment of the present invention when in use to show the second side board in an operated status.
Figure 6:
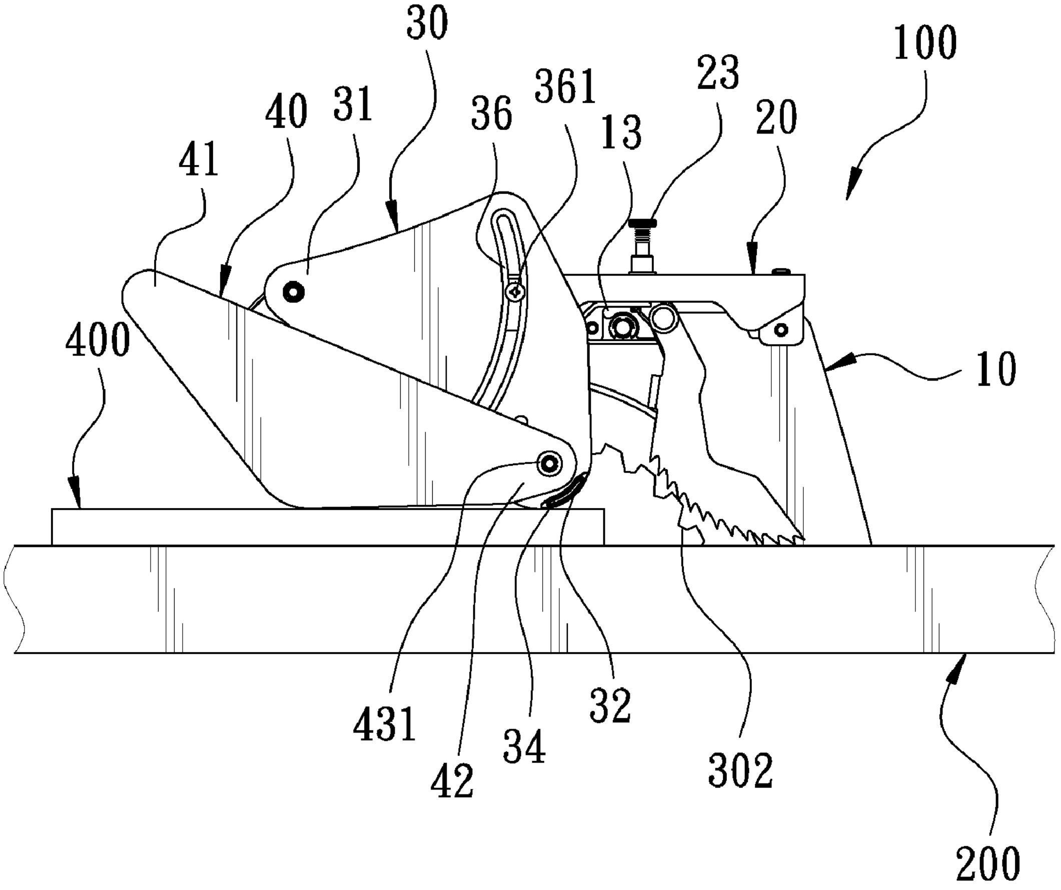
FIG. 6 is a schematic view of the preferred embodiment of the present invention when in use to show the first side board in an operated status.

Referring to FIG. 5 and FIG. 6, when the desk saw machine according to the preferred embodiment of the present invention is used to saw a plank 400, the plank 400 is aligned with the circular saw blade 302 and slowly pushed from the front of the protective cover unit 100 to lift the front end 41 of the second side board 40, such that the circular saw blade 302 is used to cut the plank 400. Because the rear end 42 of the second side board 40 is pivotally connected to the first side board 30, the first side board 30 won't be lifted along with the second side board 40 when the plank 400 lifts the second side board 40 so as to cover the circular saw blade 302 completely. When the plank 400 is further pushed to the rear end 32 of the first side board 30 as shown in FIG. 6, the first side board 30 will be guided by the limit groove 36 to turn counterclockwise and the second side board 40 will be turned clockwise subject to universal gravitation with its edge to lean against the top of the plank 400. The circular saw blade 302 is covered completely. The first side boards 30 and the second side boards 40 can be operated independently to cover the circular saw blade 302 so as to keep off the sawdust, providing a protective effect to the equipment and the user.

Figure 7:
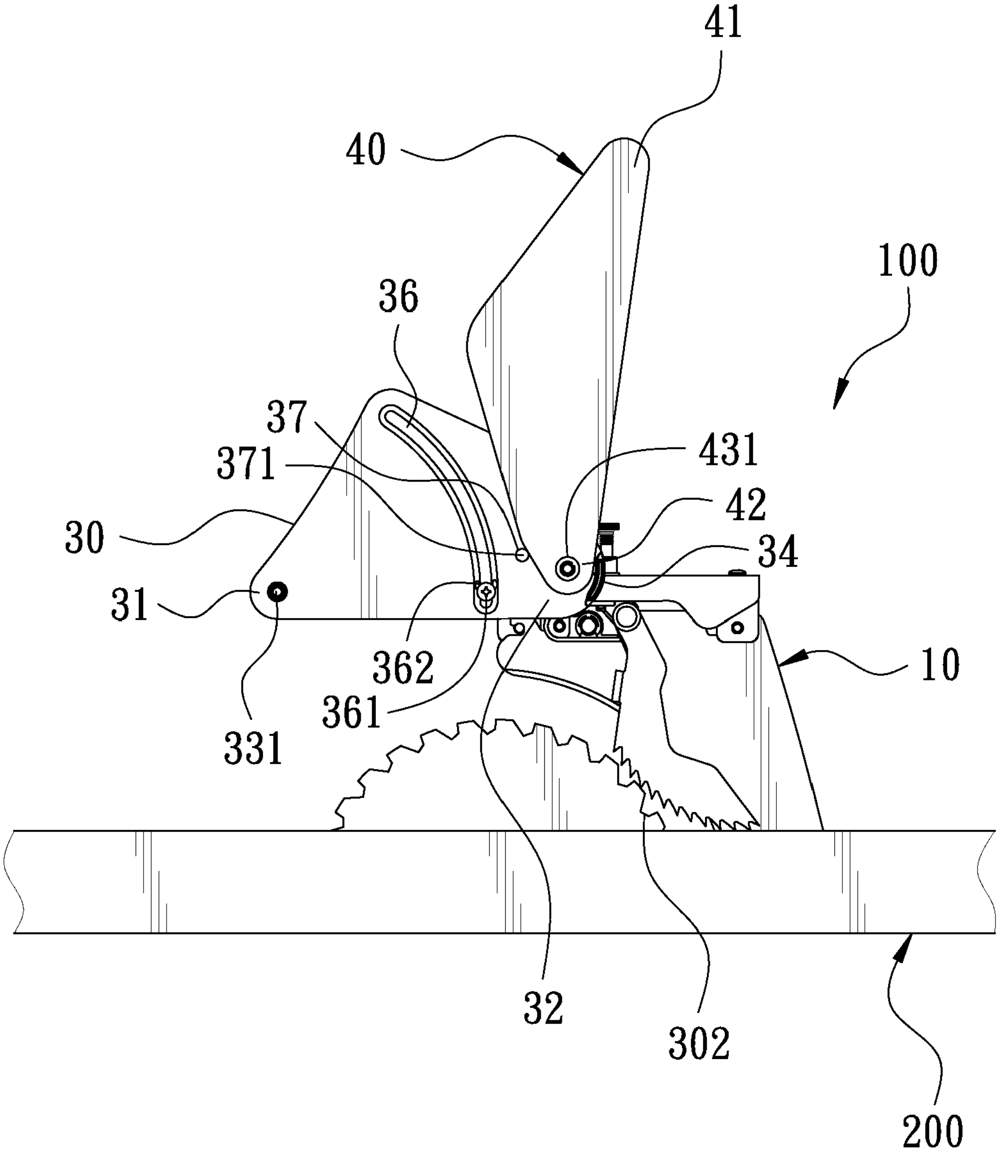
FIG. 7 is a schematic view of the preferred embodiment of the present invention in an operated status.

FIG. 7 is a schematic view showing the operation of the preferred embodiment of the present invention. The circular saw blade 302 is consumable. It is necessary to replace a new one after abrasion. When replacing the circular saw blade 302, the user only lifts the second side board 40 clockwise and inserts the limit pin 371 into the limit hole 37 to confine second side board 40 to be positioned between the limit pin 371 and the limit block 34, and then lifts the first side board 30. The first side board 30 is guided to turn counterclockwise by the limit groove 36. With the positioning protrusions 362 to be secured on the limit member 361, the first side board 30 and the second side board 40 are fixed to the cover 20 and the circular saw blade 302 is exposed for the user to replace the circular saw blade 302.

Figure 8:
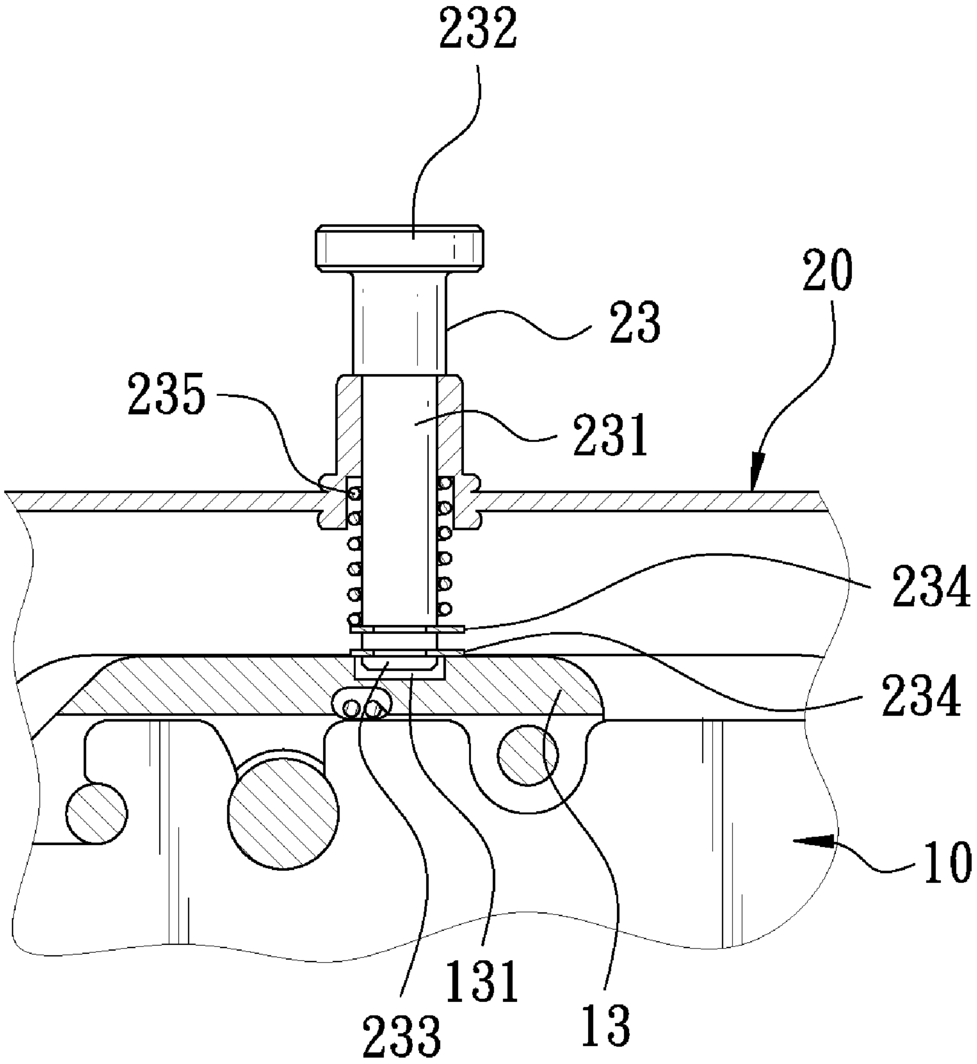
FIG. 8 is a partially enlarged cross-sectional view showing the cover according to the preferred embodiment of the present invention.

FIG. 8 is an enlarged cross-sectional view of the cover of the present invention. Referring to FIG. 3, the upper end 11 of the chopper board 10 is connected with a fixing seat 13. The fixing seat 13 has a top formed with a fixing recess 131. Two sides of the fixing seat 13 are pivotally connected with a toothed stop plate 132, respectively. The top of the cover 20 is inserted with a fixing member 23 which corresponds in position to the fixing recess 131. The fixing member 23 has a fixing rod 231. A head 232 is provided at one end of the fixing rod 231. The head 232 is protruded from the top of the cover 20. Another end of the fixing rod 231 is formed with a stop portion 233. Two C-shaped rings 234 are provided on the stop portion 233. A spring 235 is provided on the fixing rod 231 and located between the C-shaped rings 234 and an inner side of the cover 20 for compressing the stop portion 233 of the fixing rod 231 to engage with the fixing recess 131. When the user pulls the head 232, the stop portion 233 of the fixing rod 231 will be lifted up to disengage from the fixing recess 131, such that the cover 20, the first side boards 30 and the second side boards 40 can be taken out for replacing the circular saw blade 302.

Figure 9:
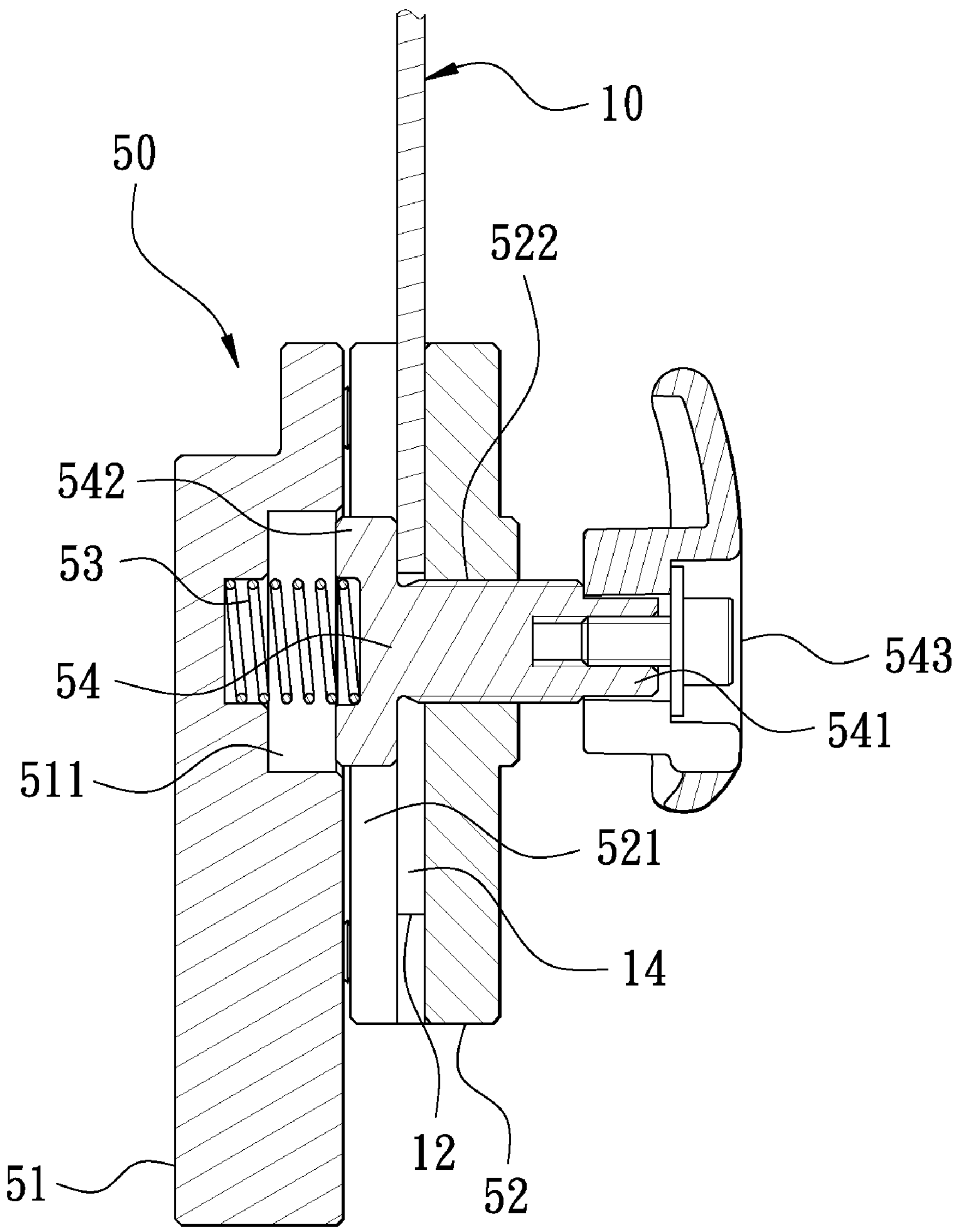
FIG. 9 is a cross-sectional view showing the quick-release unit according to the preferred embodiment of the present invention.

FIG. 9 is a cross-sectional view showing a quick-release unit of the present invention. Referring to FIG. 3, in this embodiment, the lower end 12 of the chopper board 10 is formed with a notch 14 to connect with a quick-release unit 50. The quick-release unit 50 comprises a seat 51 to connect with the fixing portion 303 of the base 300 as shown in FIG. 2. One side of the seat 51 is formed with a trough 511 corresponding to the notch 14 and provided with a casing 52. The casing 52 has one side which faces the side of the seat 51 and is formed with a slide trough 521. An opposite side of the casing 52 is formed with an insertion hole 522 corresponding to the trough 511. The trough 511 of the seat 51 of the quick-release unit 50 is inserted with a spring 53 and a bolt 54 in sequence. The bolt 54 has a tail end 541 which is inserted through the insertion hole 522 to extend out the casing 52 and connected with a rotary handle 543. When the user presses the rotary handle 543, a head 542 of the bolt 54 will be moved toward the trough 511 to disengage from the lower end 12 of the chopper board 10, so that the chopper board 10 can be taken out from the slide trough 521 for the user to replace the protective cover unit 100.

Figure 10:
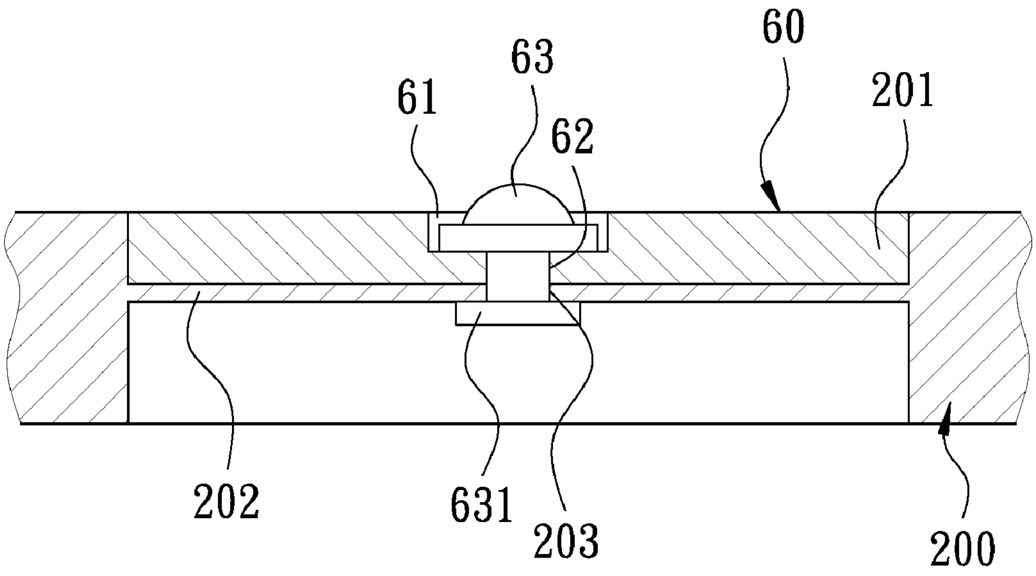
FIG. 10 is a cross-sectional view showing the protective lid according to the preferred embodiment of the present invention.

FIG. 10 is a cross-sectional view showing a protective lid of the present invention. Referring to FIG. 3, in this embodiment, a central section of the chopper board 10 is provided with a protective lid 60. The protective lid 60 has a circular trough 61 thereon, a slot 62 underneath the circular trough 61, and an engaging member 63 in the circular trough 61. The engaging member 63 has one end inserting through the slot 62 and an engaging portion 631 which laterally extends toward two sides thereof, such that the protective lid 60 is fixed to the positioning notch 203 of the worktable 200 through the engaging portion 631 to cover the through hole 201 of the worktable 200 for protecting the circular saw blade 302. When the user wants to replace the circular saw blade 302, the engaging member 63 is turned to be parallel to the positioning notch 203, such that the protective lid 60 can be taken out.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A protective cover structure of a desk sawing machine, comprising:

a chopper board having two ends to define an upper end and a lower end;

a cover disposed at the upper end of the chopper board;

two first side boards respectively disposed at two sides of the cover, each of the first side boards having two ends to define a front end and a rear end, the front end of each of the first side boards being pivotally connected to the cover, the rear end of each of the first side boards being formed with a first connection hole, each of the first side boards further having a limit groove which is located between the front end and the rear end, a limit member being inserted through the limit groove and connected to the cover to restrict rotation of the first side boards; and two second side boards respectively disposed at the two sides of the cover, each of the second side boards having two ends to define a front end and a rear end, the rear end of each of the second side boards being formed with a second connection hole, a connection member being inserted through the second connection hole and the first connection hole of the first side board and connected to the rear end of the first side board.

2. The protective cover structure of a desk sawing machine as claimed in claim 1, wherein the upper end of the chopper board is connected with a fixing seat, the fixing seat having a top formed with a fixing recess, a top of the cover being inserted with a fixing member which corresponds in position to the fixing recess, the fixing member having a fixing rod, a head being provided at one end of the fixing rod, the head being protruded from the top of the cover, another end of the fixing rod being formed with a stop portion, two C-shaped rings being provided on the stop portion, a spring being provided on the fixing rod and located between the C-shaped rings and an inner side of the cover for compressing the stop portion of the fixing rod to engage with the fixing recess.

3. The protective cover structure of a desk sawing machine as claimed in claim 1, wherein the lower end of the chopper board is formed with a notch to connect with a quick-release unit, the quick-release unit having a seat, one side of the seat being formed with a trough corresponding to the notch and provided with a casing, the casing having one side which faces the side of the seat and is formed with a slide trough, an opposite side of the casing being formed with an insertion hole corresponding to the trough, the trough of the seat of the quick-release unit being inserted with a spring and a bolt in sequence, the bolt having a tail end which is inserted through the insertion hole to extend out the casing and connected with a rotary handle.

4. The protective cover structure of a desk sawing machine as claimed in claim 1, wherein a central section of the chopper board is provided with a protective lid, the protective lid having a circular trough thereon, a slot underneath the circular trough and an engaging member in the circular trough, the engaging member having one end inserting through the slot and an engaging portion which laterally extends toward two sides thereof.

5. The protective cover structure of a desk sawing machine as claimed in claim 1, wherein the cover has a pivot hole and a fixing hole which communicate with two sides of the cover, the front end of each of the first side boards being formed with an aperture corresponding to the pivot hole of the cover, a connection shaft being inserted through the aperture and the pivot hole and connected to the cover.

6. The protective cover structure of a desk sawing machine as claimed in claim 1, wherein each of the first side boards has a limit hole which is located close to the rear end thereof for insertion of a limit pin.

7. The protective cover structure of a desk sawing machine as claimed in claim 6, wherein the limit groove of each of the first side boards is in an arc shape, two side walls of the limit groove of each of the first side boards being provided with a pair of positioning protrusions.

8. The protective cover structure of a desk sawing machine as claimed in claim 1, wherein the rear end of each of the first side board is laterally provided with a limit block.

9. The protective cover structure of a desk sawing machine as claimed in claim 1, wherein the limit member of the first side boards is a bolt.

10. The protective cover structure of a desk sawing machine as claimed in claim 1, wherein the connection member of the second side boards is a bolt.

* * * * *